Jan. 21, 1930.  M. OERTZ  1,744,138
ARRANGEMENT OF CUT-WATER RUDDERS FOR SHIPS
Filed Jan. 16, 1928  2 Sheets-Sheet 1

Inventor:
Max Oertz,

Jan. 21, 1930.　　　　　M. OERTZ　　　　　1,744,138
ARRANGEMENT OF CUT-WATER RUDDERS FOR SHIPS
Filed Jan. 16, 1928　　　2 Sheets-Sheet 2

Inventor:
Max Oertz.
by Spear, Middleton...

Patented Jan. 21, 1930

1,744,138

UNITED STATES PATENT OFFICE

MAX OERTZ, OF HAMBURG, GERMANY

ARRANGEMENT OF CUTWATER RUDDERS FOR SHIPS

Application filed January 16, 1928, Serial No. 247,087, and in Germany December 2, 1927.

In a pending application, Ser. No. 247,088, I have described rudders which are arranged outside a direct flow of the propeller current, whereas the rudders according to this invention are arranged immediately behind the propeller.

Rudders of ships which have been constructed so as to give the best steering effect, maintain a steady route, and which would be economical as regards the power used for operating them, have been specially made in the form of two-part rudder devices, comprising a small fixed part and a comparatively larger movable part (the Oertz rudder). Recent investigations have shown that the efficiency of the drive of the ship can be considerably increased by the use of a comparatively thick cut-water symmetrical or nearly symmetrical body arranged immediately behind the drive of the ship, for instance, the screw propeller, which body has a cross-section in the form of a fast-swimming fish, since the eddies of the turbulent water helix are stopped to a large extent by the front edge of the said body remaining in a constant position with respect to the drive of the ship.

The most suitable distance of such a body beyond the rearmost point of the propeller blades has been found according to the present invention to vary, according to the speed, up to 20% of the diameter of the screw propeller, and in certain special cases to be as much as 40% thereof.

To bodies having the effect above referred to, viz, of stopping the eddies, belongs in the first instance the Oertz rudder of the cutwater type described in U. S. Patent No. 1,529,208. If this form of rudder construction is used at a distance of up to 40% of the diameter of the screw propeller behind the latter, a much better effect is obtained than if the body were arranged outside the said limit with respect to the drive of the ship. Generally the most suitable distance for this form of rudder has been found to be 8% of the diameter of the screw propeller. It has been found that in order to obtain this optimum effect, it is essential according to the present invention that the head of the rudder, when the latter is in its proper position, shall remain in a constant adjusted position with respect to the axis of the propeller, this being attained by the front edge of the rudder, which plays an important part as regards the most effective stopping of the eddies of the water helix, always remaining in the same position with respect to the propeller when the rudder is operated. By employing the optimum distances with respect to the drive of the ship, such an arrangement can be substantially obtained also by the use of constructions of cut-water rudders which consist only of a movable part and in which the head of the rudder maintains each time its definite position with respect to the screw propeller when the rudder is operated.

The latter form of construction is illustrated by way of example in Figs. 1 and 4 of the accompanying drawing. The body $a$ of the rudder which has a cross-section of the character shown in dotted lines at $b$ is mounted behind the screw propeller at the most favourable distance for the stopping of the eddies. The body of the rudder itself, while still retaining a cut-water shape in cross-section, may be formed so as to have a parallel or curved-shape boundary when seen from behind, as is illustrated in Figs. 2 and 3 which show a rear view of the body $a$ of the rudder. In the form of construction illustrated in the drawing, the pivot lies exactly in the front edge of the body $a$ of the rudder. A form of construction in which the pivot lies in close proximity of the front edge of the rudder is diagrammatically illustrated in Fig. 5. The latter figure shows the body $a$ of the rudder and a member $d$ arranged at its front edge, which member forms the pivot of the rudder and at the same time acts as a reinforcing means between the two ends of the stern post. In this way it is ensured that the front edge of the rudder always maintains the most favourable position with respect to the water helix. The invention is in no way limited to the form of construction illustrated in the drawing, which shows a cut-water rudder capable of complying with the requirements of the stream lines, and if desired adapted to special purposes and which is arranged immediately behind the drive of the ship with its pivot lying in or in close proximity to the front edge of the rudder.

I wish it to be understood that the expression cut-water or stream line rudder used in the present application is intended to refer also to bodies of rudders having the forms illustrated in Figs. 6–11 of the accompanying drawing.

Fig. 6 is a cross-section taken at a point corresponding to the axis of the propeller.

For the sake of clearness the figures which have been illustrated in cross-section have been drawn on a larger scale as compared with the other figures.

Figure 1:
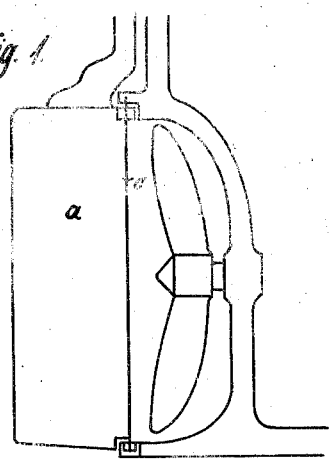
Figure 2:
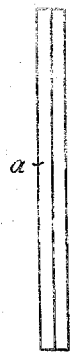
Figure 3:
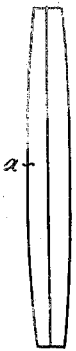
Figure 4:
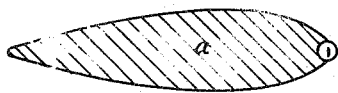
Figure 5:
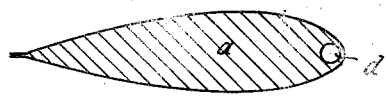
Figure 6:
Fig. 6 shows a form of rudder comprising two rudder elements which have the same character of cross section and the maximum lateral curvature of which lies at the height of the axis of the propeller.
Figures 7, 8:
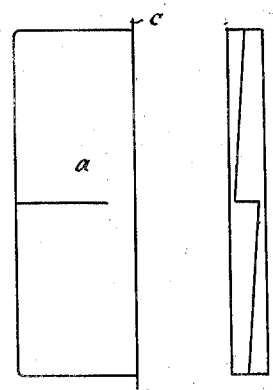
Fig. 7 is a side view, whilst
Fig. 8 is a rear view of such a rudder.
Figure 9:
Fig. 9 shows a form of construction in which the body of the rudder is formed at its front edge with surfaces in the form of guide blades, whilst the said body is flat at its rear end.
Figure 10:
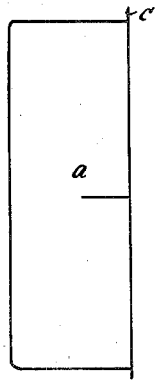
Figs. 10 and 11 illustrate a side view and a front view of the said rudder respectively.
Figure 11:

The movable body of the rudder may have a pointed rear end, as shown in Fig. 1, or a rounded off rear end as shown in Fig. 4, or, as shown in Fig. 5, the rear end may be flattened out.

The forms of rudder constructions hereinbefore referred to have been formed in such a way as to have a symmetrical cut-water shape with respect to the central longitudinal plane of the ship. It is however to be understood that the invention is not limited thereto. The cut-water body which is arranged according to the present invention at the distance above-mentioned with respect to the driving device, for instance screw propeller, may also be formed asymmetrically with respect to the central longitudinal plane of the ship, as is illustrated in Figs. 12 to 15 of the accompanying drawing.

Figure 12:
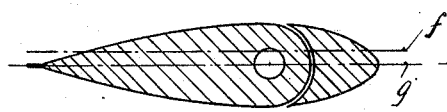

Referring to Fig. 12 the rudder is arranged with its cross-section or the central line of the cross-section parallel to the central plane of the ship in such a way as to be more or less displaced relatively thereto, the line $f$ representing the central plane of the ship and line $g$ the central line of the cross-section.

Figure 13:
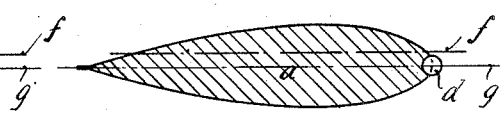

Fig. 13 illustrates a similar arrangement in connection with a construction which does not comprise two parts but only one single movable part $a$, with the pivot $d$ which is in the central line $g$ of the rudder lying displaced relatively to the central plane $f$ of the ship.

Figure 14:
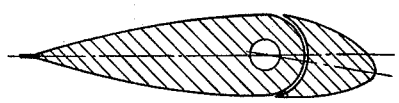
Figure 15:
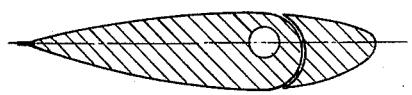

According to the arrangement illustrated in Fig. 14 only the front fixed part of the rudder is arranged asymmetrically with respect to the central longitudinal plane of the ship. The asymmetry of such a cut-water body with respect to the central plane of the ship may also be attained by this that, as is for instance illustrated in Fig. 15, the actual construction of the surfaces of the rudder is such as to produce an asymmetry with respect to the central plane of the ship.

All the cut-water forms of construction hereinbefore described, irrespective as to whether they are symmetrical or asymmetrical with respect to the central longitudinal plane of the ship and whether they have the same cross-section or the same character of cross-section along the whole height of the rudder, come within the scope of the present invention, which consists in this, that a cut-water body used as a rudder is arranged at a definite distance from the drive of the ship. The invention is not intended to be applied to balance rudders and to rudder devices containing balance rudders.

What I claim is:

The combination with a screw propeller driven ship of a cutwater streamline type of rudder device, other than one of the balanced type, located directly to the rear of the propeller, the front edge of said rudder device being convex in cross section and spaced astern of the propeller blades at a distance determined by the diameter of the propeller, said distance being up to a maximum of 40% of the diameter of the propeller, thereby ensuring a most effective stopping of the eddies and a considerable increase in the efficiency of the propeller.

In testimony whereof, I affix my signature.

Dr. MAX OERTZ.